United States Patent
Yen et al.

(10) Patent No.: US 9,327,939 B2
(45) Date of Patent: May 3, 2016

(54) ENERGY-SAVING ELECTRICITY FEEDBACK DEVICE AND METHOD FOR AN ELEVATOR

(71) Applicant: DELTA ELECTRONICS COMPONENT (WU JIANG) LTD., Wujiang, Jiangsu Province (CN)

(72) Inventors: Liangyi Yen, Wujiang (CN); Shifeng Shao, Wujiang (CN)

(73) Assignee: DELTA ELECTRONICS COMPONENT (WU JIANG) LTD. (CN)

( * ) Notice: Subject to any disclaimer, the term of this patent is extended or adjusted under 35 U.S.C. 154(b) by 514 days.

(21) Appl. No.: 13/845,610

(22) Filed: Mar. 18, 2013

(65) Prior Publication Data

US 2014/0076666 A1    Mar. 20, 2014

(30) Foreign Application Priority Data

Sep. 20, 2012  (CN) .......................... 2012 1 0350021

(51) Int. Cl.
*B66B 1/30* (2006.01)
*H02P 3/18* (2006.01)

(52) U.S. Cl.
CPC .. *B66B 1/302* (2013.01); *H02P 3/18* (2013.01)

(58) Field of Classification Search
CPC .................................. B66B 1/302; H02P 3/18
USPC ......... 187/247, 277, 290, 293, 391, 393, 289, 187/296, 297; 318/375, 376, 798–805
See application file for complete search history.

(56) References Cited

U.S. PATENT DOCUMENTS

| | | | | |
|---|---|---|---|---|
| 4,554,999 A * | 11/1985 | Kamaike | ............... | H02J 7/0078 187/290 |
| 4,666,020 A * | 5/1987 | Watanabe | .................. | B66B 5/02 187/290 |
| 5,896,948 A * | 4/1999 | Suur-Askola | ............. | B66B 1/30 187/290 |
| 6,315,081 B1 * | 11/2001 | Yeo | .......................... | B66B 5/02 187/290 |
| 6,454,053 B2 * | 9/2002 | Tominaga | ................. | B66B 1/30 187/290 |
| 6,460,658 B2 * | 10/2002 | Suga | ......................... | B66B 1/30 187/290 |
| 6,827,182 B2 * | 12/2004 | Araki | ...................... | B66B 5/027 187/290 |

(Continued)

FOREIGN PATENT DOCUMENTS

| | | |
|---|---|---|
| CN | 101792078 | 8/2010 |
| CN | 101360674 | 8/2011 |

*Primary Examiner* — Anthony Salata
(74) *Attorney, Agent, or Firm* — Hauptman Ham, LLP

(57) ABSTRACT

An elevator electricity feedback device includes a sampling unit, a transmitting unit, and a central processing unit. The sampling unit is electrically connected with an energy supply network of the elevator and the CPU, the transmitting unit is electrically connected with a motor driver of the elevator and electrically connected with the energy supply network through an AC resistor; and the CPU is electrically connected with the transmitting unit. The transmitting unit is electrically connected with the motor driver of the elevator to feed back an energy of the motor driver to the energy supply network when the motor driver is in an energy generating state so that an effect of conserving energy is achieved. In the energy generating state, a DC current produced by the motor driver is converted into AC current which is transmitted to the energy supply network.

13 Claims, 4 Drawing Sheets

(56) References Cited

U.S. PATENT DOCUMENTS

| | | | |
|---|---|---|---|
| 7,170,245 B2 * | 1/2007 | Youm | H02P 3/22 318/268 |
| 7,588,125 B2 * | 9/2009 | Ueda | B66B 1/285 187/293 |
| 8,127,894 B2 | 3/2012 | Agirman et al. | |
| 8,146,714 B2 * | 4/2012 | Blasko | B66B 1/30 187/290 |
| 8,172,042 B2 * | 5/2012 | Wesson | B66B 1/308 187/290 |
| 8,230,978 B2 * | 7/2012 | Agirman | B66B 5/027 187/290 |
| 8,674,631 B2 * | 3/2014 | Kono | B60L 3/04 187/290 |

* cited by examiner

ENERGY-SAVING ELECTRICITY FEEDBACK DEVICE AND METHOD FOR AN ELEVATOR

TECHNICAL FIELD OF THE INVENTION

The present invention relates to a field of automatic control, and more particularly to, an elevator electricity feedback device, an elevator electricity feedback method and an elevator thereof.

BACKGROUND OF THE INVENTION

According to statistical reports by China's elevator association, in China the number of elevators being used is now 1.5 million, and the number of sold elevators is increasing by more than 150 thousand per year. This means China has become an elevator superpower in the world. With increasing number of elevators used in China, an electricity consumption amount of a typical elevator is approximate 50-100 kWh/day. By electricity consumption per day of 80 kWh for each elevator, with the conservative estimated elevator numbers of 1.5 million, the total electricity consumption per day is calculated approximate 120 million KWh, and hence the total electricity consumption per year is 43.8 billion KWh. In this manner, the energy consumption per year of the whole China elevators is equivalent to seven-month energy generation by the Three Gorges' Hydropower Station. Evidently, the elevator energy consumption is tremendous. Therefore, this brings an elevator energy-conservation demand without a moment delay. Energy-conserving elevators are the inevitable trends in the future elevator development.

The elevator travel regulation is very special, primarily including ascending and descending movements each for 50%. When the elevator is in an ascending condition without load, the counter-weight of the elevator pulls the elevator so that a tractor of the elevator is in an energy generating state; similarly, when the elevator is in a descending condition with a full load, the elevator is also in an energy generating state.

The tractor of the elevator is in the energy generating state when ascending in a no-load condition and descending in a full-load condition so that DC voltage of a driver is raised by the energy generated by the tractor. In order to ensure the driver operating normally, the energy generated by the tractor needs to be released. A traditional method is to add a braking unit and a braking resistor to the driver, namely a heat dissipation approach, to dissipate the energy generated by the tractor by the braking resistor.

Because the energy generated by the tractor is dissipated by the braking resistor in heat dissipation, the energy is not effectively utilized. Currently there are a few methods involving effective utilization of the dissipated energy, and three methods are discussed in the following.

1. A method of adopting a large capacitor is introduced. When the tractor of the elevator is in the energy generating state, the large capacitor is charged through a circuit so that the energy in the large capacitor can be utilized for a control circuit of the driver. The method adopting the large capacitor is an advancement of reutilization of the energy generated by the tractor but electric power of the control circuit of the driver is low, and the energy consumption the control circuit of the driver is also low so that a part of the energy generated by the tractor that cannot be completely stored in the large capacitor is still necessarily dissipated by the braking resistor in heat dissipation.

2. A method of adopting storing-energy batteries is introduced, the principle of which is the same as the large capacitor method described above.

3. A simpler energy-conserving method is to power-off the driver and a lighting power when the elevator is in a standby state. In fact, this energy-conserving method cannot completely solve the problem of elevator energy consumption.

The above-mentioned methods cannot completely accomplish purposes of conserving energy.

SUMMARY OF THE INVENTION

To solve the above-mentioned drawbacks, an objective of the present invention is to provide an elevator electricity feedback device, an elevator electricity feedback method and an elevator thereof.

In order to solve the above-mentioned problem, the present invention provides an elevator electricity feedback device which comprises a sampling unit, a transmitting unit and a central processing unit (CPU). The sampling unit which is electrically connected to an energy supply network of an elevator and the CPU is utilized for sampling alternating current (AC) signals of the energy supply network and inputting the sampled AC signals to the CPU. The transmitting unit which is electrically connected to a motor driver of the elevator is electrically connected with the energy supply network through an AC resistor, and when the motor driver is in an energy consuming state, the transmitting unit transmits energy produced by the energy supply network to the motor driver; when the motor driver is in an energy generating state, the transmitting unit feeds back energy produced by the motor driver to the energy supply network. The CPU which is electrically connected with the transmitting unit is utilized for inputting the AC signals obtained by the sampling unit to the transmitting unit.

Optionally, the transmitting unit further comprises a detector, a pulse width modulation (PWM) unit, and a switch. The switch is electrically connected with the motor driver and electrically connected with the energy supply network through the AC resistor, and when the motor driver is in the energy consuming state, the switch converts the AC current provided by the energy supply network into DC current which is transmitted to the motor driver; when the motor driver is in the energy generating state, the switch inverts the DC current produced by the motor drive into AC current which is transmitted to the energy supply network. The detector is electrically connected with the motor driver and the CPU, and the detector is utilized for detecting an operating state of the motor driver and inputting the detected operating state of the motor driver to the CPU. The PWM unit is electrically connected with the CPU and the switch, and the PWM unit is utilized for obtaining the AC signals of the energy supply network, and when the motor driver is in an energy generating state, the PWM unit synchronizes the current transmitted to the energy supply network by the switch and the existing current of the energy supply network.

Optionally, the detector further comprises a capacitor and a threshold value judgment unit such that the capacitor is electrically coupled with the motor drive, the threshold value judgment unit is electrically coupled with the capacitor and the CPU, and the detector is utilized for comparing a voltage between two ends of the capacitor with a voltage threshold value, and transmitting a control signal to the CPU according to a comparing result.

Optionally, the detector further comprises a communication port, and the communication port is electrically connected with the CPU and is utilized for reporting operating parameters of the electricity feedback device to a bus.

Optionally, the electricity feedback device has operation parameters which include operating times, total energy of the energy feedback, and feedback frequencies.

Optionally, the electricity feedback device further comprises an external multifunction terminal, such that the external multifunction terminal is electrically connected with the CPU and is utilized for controlling enablement and disablement of the electricity feedback device and obtaining a malfunction code of the electricity feedback device.

Optionally, the sampling unit comprises a voltage detector and a current detector, such that the voltage detector is utilized for sampling AC voltage signals of the energy supply network and the current detector is utilized for sampling AC signals of the energy supply network.

Optionally, the energy generating state of the motor driver corresponds to either an ascending no-load condition or a descending full-load condition of the elevator.

The present invention further provides an elevator electricity feedback method by adopting the above-mentioned device, which comprises the following steps; sampling the AC signals of the energy supply network by the sampling unit; detecting the operating state of the motor driver by the transmitting unit and transmitting the operating state of the motor driver to the CPU; and when the motor driver is in the energy generating state, the CPU controlling the transmitting unit to feed back energy produced by the motor driver to the energy supply network, a feedback current being controlled by a sampling signal of the sampling unit to ensure that the feedback current and the existing current of the energy supply network are synchronous.

Optionally, the electricity feedback device includes the transmitting unit further comprises a detector, a pulse width modulation (PWM) unit, and a switch. The step of detecting the operating state of the motor driver by the transmitting unit further adopts the operating state of the motor driver detected by the detector, and the detected operating state of the motor driver is transmitted to the CPU; the control method of the feedback current controlled by the signals sampled by the sampling unit comprises obtaining the AC signals from the CPU by the PWM unit, and controlling the AC current transmitted from the switch to the energy supply network to synchronize with the existing current of the energy supply network according to the AC signals.

Optionally, the transmitting unit includes the detector further comprises a capacitor and a threshold value judgment unit, such that the detector includes the capacitor is electrically coupled with the motor driver of the elevator, and the threshold value judgment unit is electrically coupled with the capacitor; the operating state of the motor driver of the elevator detected by the detector further comprises adopting the threshold value judgment unit to compare a voltage between two ends of the capacitor with a voltage threshold value, and transmitting an operating state signal of the motor driver to the CPU according to a comparing result.

Optionally, the detector includes the threshold value judgment unit transmits a high level signal to the CPU for representing the motor driver in the energy consuming state; the threshold value judgment unit transmits a low level signal to the CPU for representing the motor driver in the energy generating state.

The present invention further provides an elevator having a motor driver, an AC resistor, and the above-mentioned electricity feedback device.

The advantages of the present invention are as follows, the transmitting unit is electrically connected with the motor driver of the elevator to feed back the energy of the motor driver to the energy supply network when the motor driver is in an energy generating state, so that an effect of conserving energy is achieved.

DETAILED DESCRIPTION OF THE INVENTION

Embodiments of an elevator electricity feedback device, an elevator electricity feedback method and an elevator thereof provided by the present invention are described in detail with the following accompanying diagrams.

Figure 1:
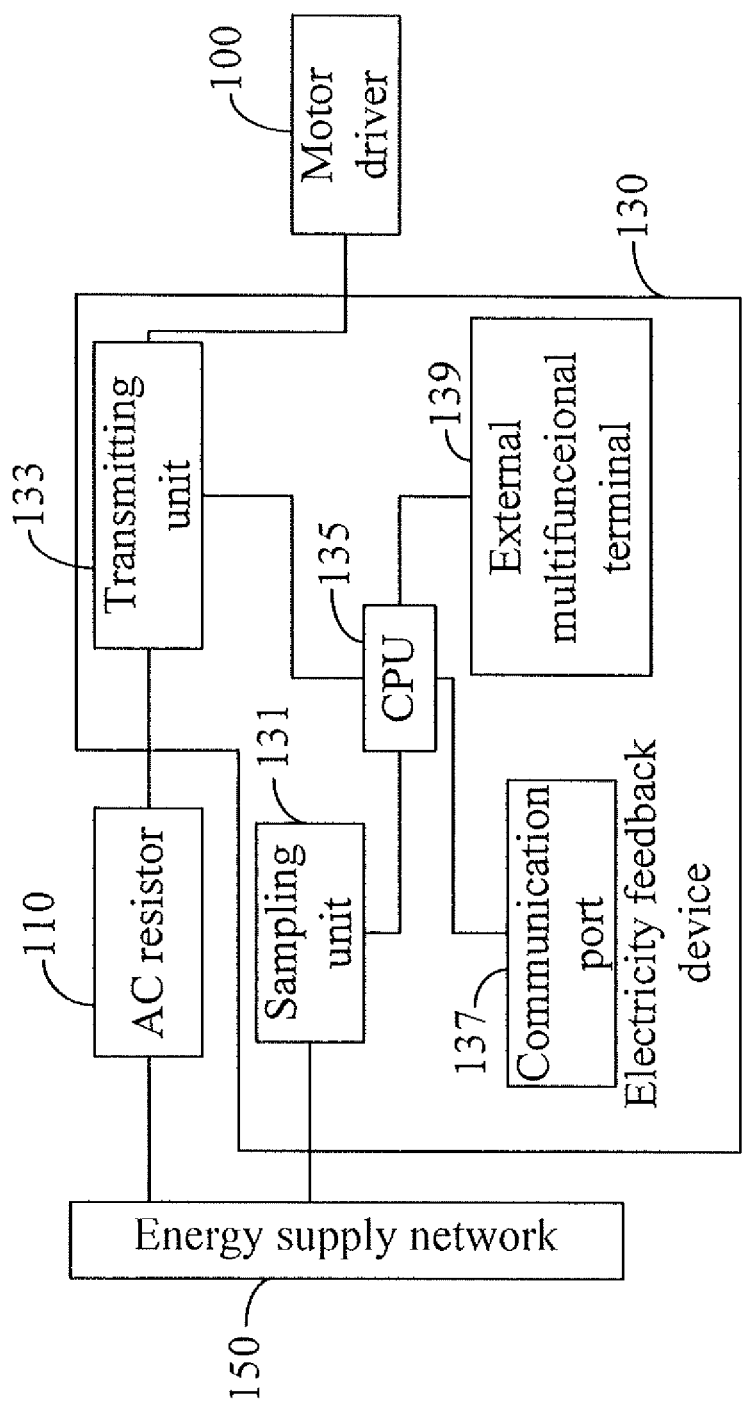
FIG. 1 illustrates a schematic structural diagram of an elevator control system according to one embodiment of the present invention.

FIG. 1 illustrates a schematic structural diagram of an elevator control system according to one embodiment of the present invention, which comprises a motor driver 100, an AC resistor 110 and an electricity feedback device 130. The motor driver 100 is electrically connected with the electricity feedback device 130, and the electricity feedback device 130 is electrically connected with an energy supply network 150 through the AC resistor 110.

The electricity feedback device 130 further comprises a sampling unit 131, a transmitting unit 133, a central processing unit (CPU) 135, a communication port 137 and an external multifunction terminal 139.

The sampling unit 131 is electrically connected with the energy supply network 150 and the CPU 135 and utilized for sampling alternating current (AC) signals of the energy supply network 150, wherein the AC signals includes voltage signals and current signals for each phase of a three-phase alternating current in the energy supply network 150. The sampling unit 131 is also electrically connected with the CPU 135 and thereby inputs the AC signals sampled from the energy supply network 150 to the CPU 135 so as to ensure successive synchronizations of the frequencies and phases between an existing current in the energy supply network 150 and a feedback current when the transmitting unit 133 feeds back the energy.

The transmitting unit 133 is electrically connected to the motor driver 100, and through the AC resistor 110, electrically connected to the energy supply network 150. When the motor driver 100 is in an energy consuming state, the transmitting unit 133 transmits an energy provided by the energy supply network 150 to the motor driver 150. When the motor driver 100 is in an energy generating state, the transmitting unit 133 feeds back an energy produced by the motor driver 100 to the energy supply network 150. The energy generating state of the motor driver 100 corresponds to either an ascending no-load condition or a descending full-load condition of the elevator. The transmitting unit 133 is further electrically connected to the CPU 135 so that the CPU 135 can obtain the AC signals sampled by the sampling unit 131 from the energy supply network 150 to ensure successive synchronizations of the frequencies and phases between the existing current in the energy supply network 150 and the feedback current.

The communication port 137 is an optional element to be electrically connected with the CPU 135 and utilized for reporting a few operating parameters of the electricity feedback device 130 to a bus, for instance, a PROFIBUS. The operating parameters include operating times, total energy of the energy feedback, feedback frequency, and so on. The application of the communication port 137 can be utilized further for extending in environments using the device.

The external multifunction terminal 139 is an optional element to be electrically connected with the CPU 135 and utilized for connecting an external control device. For instance, a computer for controlling enablement and disablement of the electricity feedback device 130, also pre-sets a set of malfunction code in the CPU 135 so that the external multifunction terminal 139 can obtain the set of malfunction code when the device has malfunctioned, so as to find out the malfunction reasons of the device.

Figure 2:
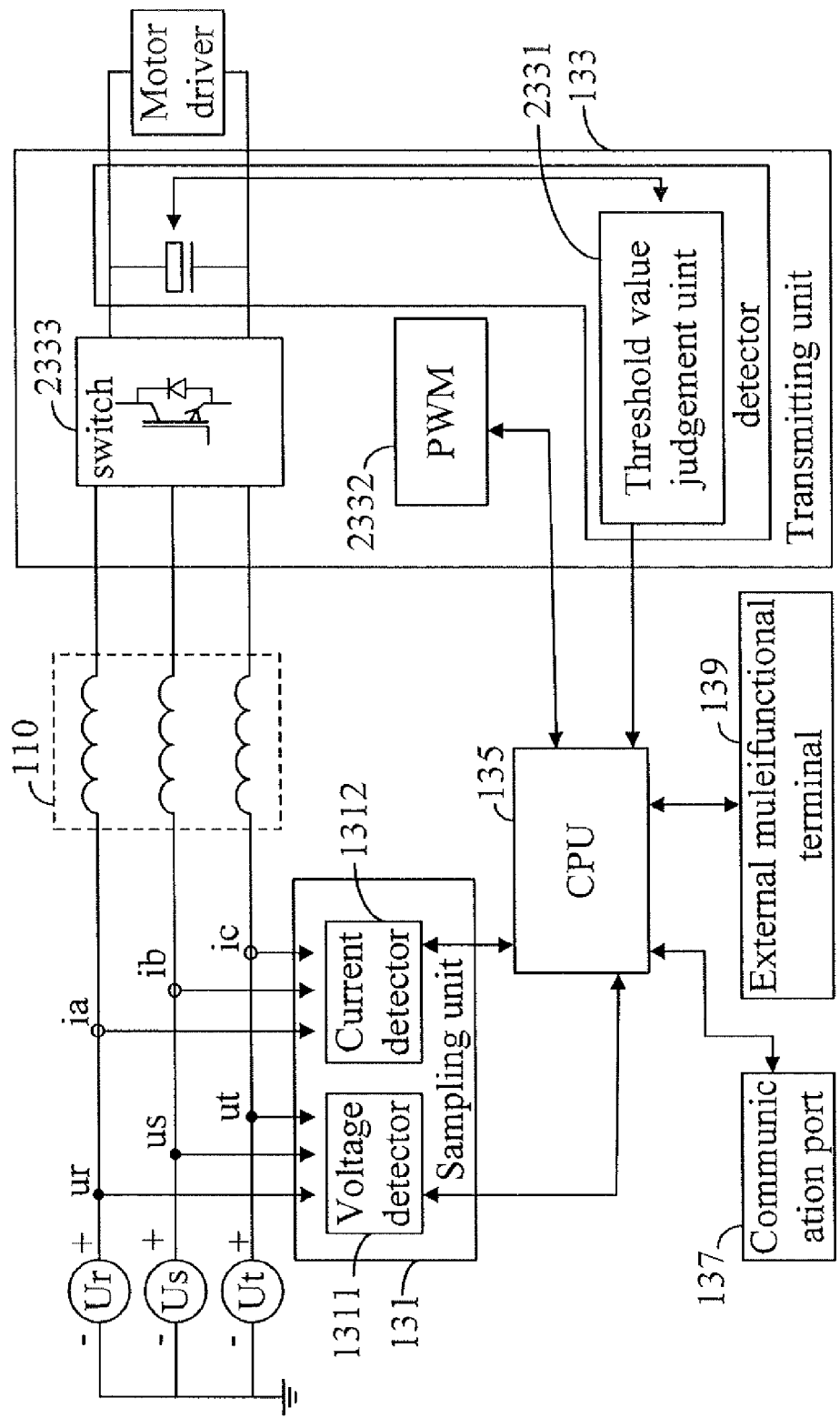
FIG. 2 illustrates a concrete architectural diagram of the elevator control system shown in FIG. 1.
Figure 3:
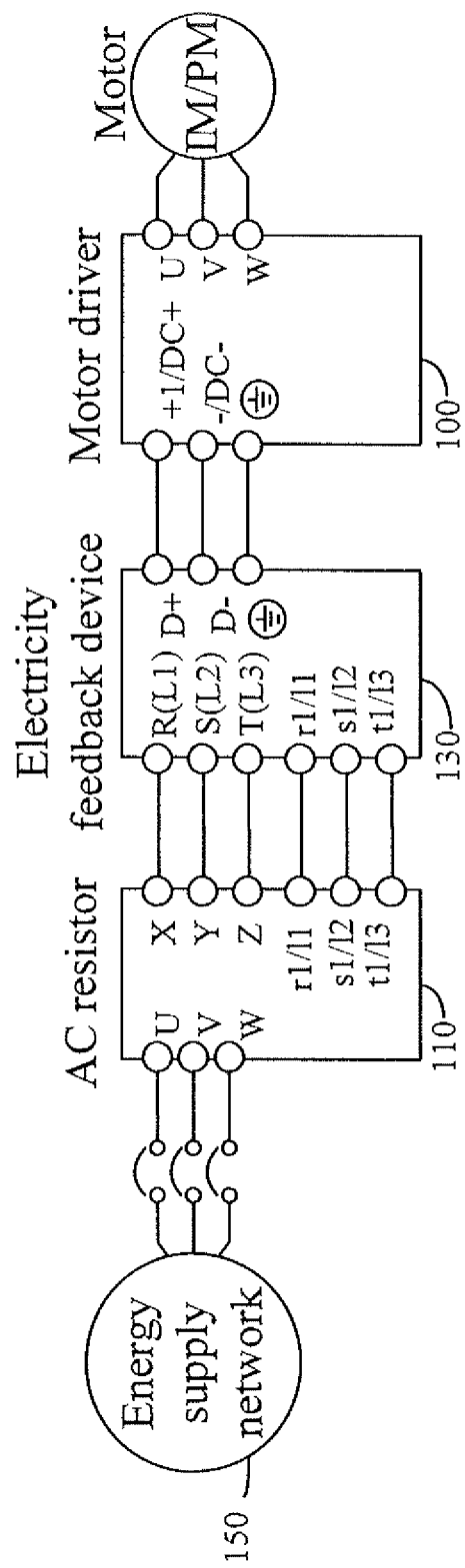
FIG. 3 illustrates a circuit wiring diagram with relation to FIG. 2.

Please refer to FIG. 2 and FIG. 3. FIG. 2 illustrates a concrete architectural diagram of the control system shown in FIG. 1, and FIG. 3 illustrates a circuit wiring diagram which with relation to FIG. 2. The AC resistor 110 can be three inductors, each corresponds to the three-phase current of the energy supply network 150 respectively. The sampling unit 131 further comprises a voltage detector 1311 and a current detector 1312, the voltage detector 1311 and the current detector 1312 are utilized for sampling the AC signals of the energy supply network 150 which comprise the voltage signals and the current signals of every phase of the three-phase AC current in the energy supply network 150. More particularly, the voltage detector 1311 is utilized for sampling AC voltage signals of the energy supply network 150, and the current detector 1312 is utilized for sampling AC current signals of the energy supply network 150.

The transmitting unit 133 further comprises a detector 2331, a pulse width modulation (PWM) unit 2332, and a switch 2333. The switch 2333 is electrically connected with the motor driver 100, and through the AC resistor 110, electrically connected with the energy supply network 150, and when the motor driver 100 is in the energy consuming state, the switch 2333 converts a AC current provided by the energy supply network 150 into DC current which is transmitted to the motor driver 100; and when the motor driver 100 is in the energy generating state, the switch 2333 inverts a DC current produced by the motor drive 100 into AC current which is transmitted to the energy supply network 150. In this embodiment, the switch 2333 can be an Insulated Gate Bipolar Transistor (IGBT). In an inverting state, the switch 2333 inverts the DC current produced by the motor driver 100 to the AC current, and the frequencies and phases of the AC current are controlled by the PWM unit 2332. The PWM unit 2332 is electrically connected with the CPU 135 and the switch 2333 and utilized for obtaining voltage and current states of the energy supply network 150 from the CPU 135, especially for obtaining information of the frequencies and phases to ensure successive synchronizations between the AC current fed back to the energy supply network 150 by the switch 2333 and the existing current of the energy supply network 150 when the motor driver 100 is energy generating state.

The detector 2331 is electrically connected with the motor driver 100 and the CPU 135 and utilized for detecting an operating state of the motor driver 100 and thereby inputs the detected operating state of the motor driver 100 to the CPU 135. In this embodiment, the detector 2331 further comprises a capacitor C and a threshold value judgment unit M, the capacitor C is electrically coupled with the motor drive 100, and the threshold value judgment unit M is electrically coupled with the capacitor C and the CPU to determine a voltage between two ends of the capacitor C and transmits a control signal to the CPU 135. In an exemplar of an Chinese standard city energy supply network as the energy supply network 150, when the motor driver 100 is in the energy consuming state, a AC current provided from the energy supply network 150 is commutated to a DC current with 540V through the switch 2333 so that the voltage between two ends of the capacitor C is 540V. Therefore, when the voltage between two ends of the capacitor C is detected to 540V by the threshold value judgment unit M, the motor driver 100 is considered in the energy consuming state, and such a state of the motor driver 100 is reported to the CPU 135. When the motor driver 100 is transferred from the energy consuming state to the energy generating state, the capacitor C is through a discharging and a charging processes, that is, the voltage between two ends of the capacitor C will fall and then rise. With the motor driver 100 generating energy constantly, the voltage between two ends of the capacitor C also raises constantly, and when the voltage between two ends of the capacitor C reaches a pre-set threshold value, for instance 600V, the motor driver 100 is considered in the energy generating state, and the state of the motor driver 100 is reported to the CPU 135. Then, the PWM unit 2332 and the switch 2333 are controlled by the CPU 135 to feed back the energy generated by the motor driver 100 to the energy supply network 150. In the process of the motor driver 100 transforming from energy generation to energy consuming, the threshold value judgment unit M adopts the similar operating mode.

Figure 4:
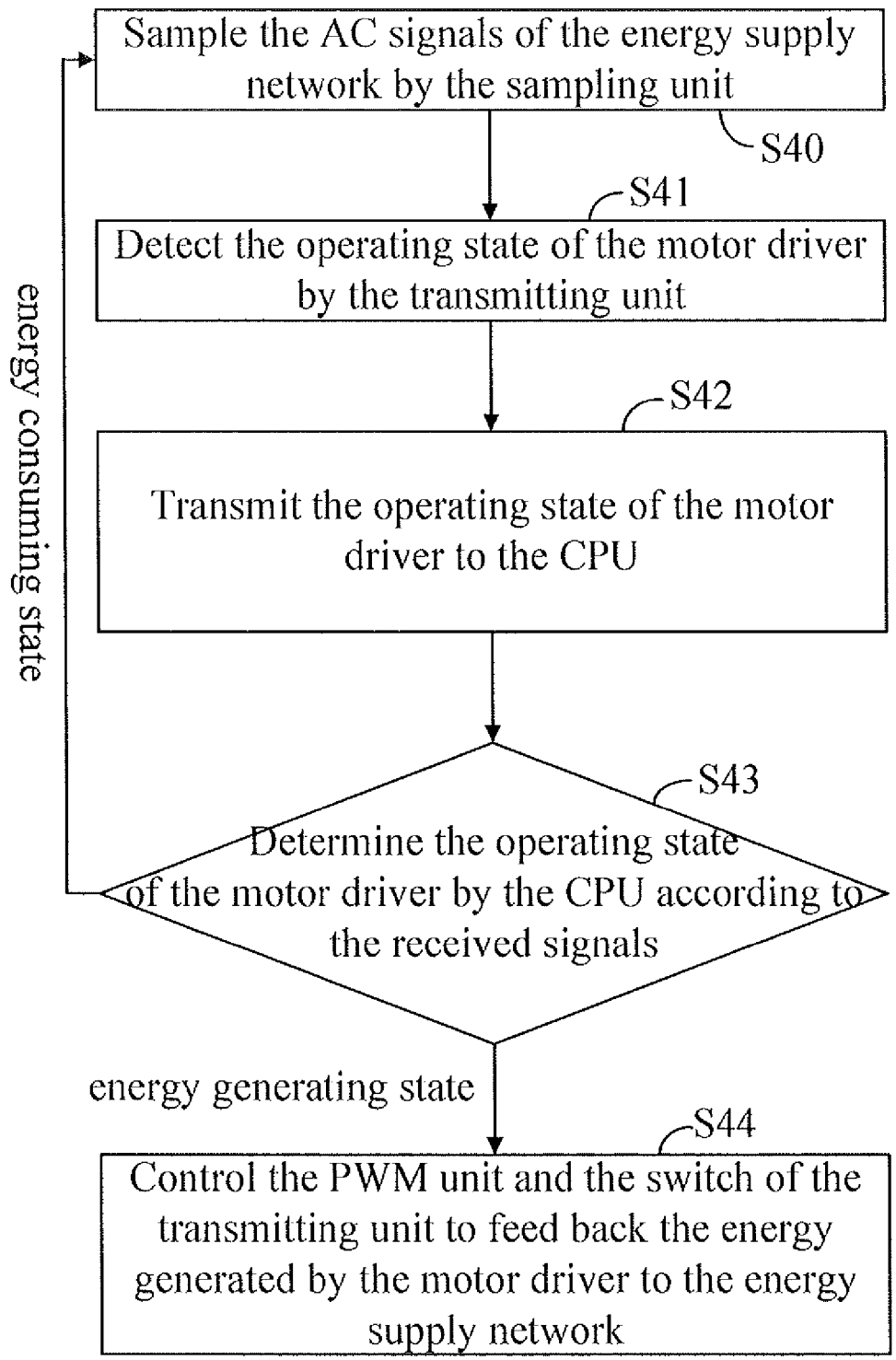
FIG. 4 illustrates a flow chart of an elevator electricity feedback method according to an embodiment of the present invention.

Referring to FIG. 4, a flow chart of an electricity feedback method according to an embodiment of the present invention by adopting the devices shown in FIG. 1 to FIG. 3 are illustrated, which comprises the steps are as follows: In step S40, the AC signals of the energy supply network 150 are sampled by the sampling unit 131. The step particularly comprises utilizing sampled voltage signals and current signals of each phase of a three-phase alternating current in the energy supply network 150 to ensure successive synchronizations of the frequencies and phases between the existing current in the energy supply network 150 and the feedback current.

In step S41, the operating state of the motor driver 100 is detected by the transmitting unit 133. The step particularly comprises comparing a voltage between two ends of the capacitor with a voltage threshold value. In an exemplar of a Chinese standard city energy supply network as the energy supply network 150, when the motor driver 100 is in the energy consuming state, the voltage between two ends of the capacitor C is 540V so that the motor driver 100 is considered in the energy consuming state. When the motor driver 100 is transferred from the energy consuming state to the energy generating state, the capacitor C undergoes a discharging and a charging processes, and when the threshold value judgment unit M detects the voltage between two ends of the capacitor C reaches the pre-set threshold value, for instance, a larger than 540V, 600V or 650V, the motor driver 100 is considered in the energy generating state.

In step S42, an operating state signal of the motor driver 100 is transmitted to the CPU 135 according to a comparing result. More particularly, as long as the motor driver 100 is considered in the energy consuming state as the step S41, a signal for representing the motor driver 100 being in the energy consuming state is transmitted to the CPU 135, and as long as the motor driver 100 is considered in the energy generating state in step S41, a signal for representing the motor driver 100 being in the energy generating state is transmitted to the CPU 135. For example, a high level electrical signal and a low level electrical signal can represent the two states of the motor driver 100, respectively. The threshold value judgment unit M transmits a high level electrical signal to CPU 135 to represent the motor driver 100 being in the energy consuming state; and the threshold value judgment unit M transmits a low level electrical signal to CPU 135 to represent the motor driver 100 being in the energy generating state.

In step S43, the CPU 135 determines the operating state of the motor driver 100 according to the received signals. If the motor driver 100 is in the energy generating state, the step S44 is executed, and if the motor driver 100 is in the energy consuming state, the process of the electricity feedback method returns to step S40, that is, no action is executed, so that the detecting and sampling of above-mentioned are executed, continually.

In step S44, the PWM unit 2332 and the switch 2333 of the transmitting unit 133 are controlled by the CPU 135 to feed back the energy generated by the motor driver 100 to the energy supply network 150, and the PWM unit 2332 obtains sampled signals from the CPU 135, so as to control synchronization between the AC current transmitted from the switch 2333 to the energy supply network 150 and the existing current of the energy supply network 150.

The present invention has been disclosed as the preferred embodiments above, however, the above preferred embodiments are not described for limiting the present invention, various modifications, alterations and improvements can be made by persons skilled in this art without departing from the spirits and principles of the present invention, and therefore the protection scope of claims of the present invention is based on the range defined by the claims.

What is claimed is:

1. An elevator electricity feedback device comprising:
a sampling unit;
a transmitting unit; and
a central processing unit (CPU),
wherein
the sampling unit is electrically connected to an energy supply network of an elevator and the CPU,
the sampling unit is configured to sample alternating current (AC) signals of the energy supply network and to input the sampled AC signals to the CPU,
the transmitting unit is electrically connected to a motor driver of the elevator, and through an AC resistor, electrically connected to the energy supply network, wherein the transmitting unit is configured to transmit an energy provided by the energy supply network to the motor driver if the motor driver is in an energy consuming state, and the transmitting unit is configured to invert a DC current produced by the motor driver into an AC current and to transmit the AC current to the energy supply network if the motor driver is in an energy generating state such that the energy produced by the motor driver is fed back to the energy supply network, and
the CPU is electrically connected with the transmitting unit and configured to input the AC signals obtained by the sampling unit to the transmitting unit.

2. The elevator electricity feedback device of claim 1, wherein the transmitting unit further comprises:
a detector;
a pulse width modulation (PWM) unit; and
a switch,
wherein
the switch is electrically connected with the motor driver,
the switch is electrically connected with the energy supply network through the AC resistor,
the switch is configured to convert the AC current provided by the energy supply network into the DC current which is transmitted to the motor if the motor driver is in the energy consuming state, and the switch is configured to invert the DC current produced by the motor drive into the AC current which is transmitted to the energy supply network, if the motor driver is in the energy generating state,
the detector is electrically connected with the motor driver and the CPU and configured to detect an operating state of the motor driver and to input the detected operating state of the motor driver to the CPU,
the PWM unit is electrically connected with the CPU and the switch, and
the PWM unit is configured to obtains the AC signals of the energy supply network and to synchronize the current transmitted to the energy supply network by the switch and existing current of the energy supply network if the motor driver is energy generating state.

3. The elevator electricity feedback device of claim 2, wherein the detector further comprises:
a capacitor; and
a threshold value judgment unit,
wherein
the capacitor is electrically coupled with the motor drive,
the threshold value judgment unit is electrically coupled with the capacitor and the CPU, and
the detector is further configured to compare a voltage between two ends of the capacitor with a voltage threshold value, and to transmit a control signal to the CPU according to a comparison result.

4. The elevator electricity feedback device of claim 1, wherein the elevator electricity feedback device further comprises:
a communication port electrically connected with the CPU and configured to facilitate reporting operating parameters of the elevator electricity feedback device to a bus.

5. The elevator electricity feedback device of claim 4, wherein the operation parameters comprise operating times, total energy of the energy feedback, and feedback frequency.

6. The elevator electricity feedback device of claim 1, wherein the electricity feedback device further comprises:
an external multifunction terminal electrically connected with the CPU, and configured to control enablement and disablement of the electricity feedback device and to obtain a malfunction code of the electricity feedback device.

7. The elevator electricity feedback device of claim 1, wherein the sampling unit comprises:
a voltage detector configured to sample AC voltage signals of the energy supply network; and
a current detector configured to sample AC signals of the energy supply network.

8. The elevator electricity feedback device of claim 1, wherein the energy generating state of the motor driver corresponds to either an ascending no-load condition or a descending full-load condition of the elevator.

9. An elevator electricity feedback method applied for the elevator electricity feedback device of claim 1, the method comprising:
sampling the AC signals of the energy supply network by the sampling unit;
detecting the operating state of the motor driver by the transmitting unit;
transmitting the operating state of the motor driver to the CPU;
inverting a DC current produced by the motor driver into the AC current if the motor driver is in the energy generating state; and
transmitting the energy to the supply network if the motor driver is in the energy generating state, wherein the CPU controls the transmitting unit to feedback energy produced by the motor driver to the energy supply network, and a feedback current is controlled by a sampling signal of the sampling unit to ensure that the feedback current and the existing current of the energy supply network are synchronous.

10. The elevator electricity feedback method of claim 9, wherein the transmitting unit further comprises a detector, a pulse width modulation (PWM) unit and a switch, the step of detecting the operating state of the motor driver by the transmitting unit further comprises adopting the operating state of the motor driver detected by the detector, and transmitting the detected operating state of the motor driver to the CPU, and the control method of the feedback current controlled by the signals sampled by the sampling unit comprises obtaining the AC signals from the CPU by the PWM unit, and controlling the AC current transmitted from the switch to the energy supply network to synchronize with the existing current of the energy supply network, according to the AC signals.

11. The elevator electricity feedback method of claim 10, wherein the detector further comprises:

a capacitor; and a threshold value judgment unit, wherein the capacitor is electrically coupled with the motor driver of the elevator, the threshold value judgment unit is electrically coupled with the capacitor, and detecting the operating state of the motor driver of the elevator by the detector further comprises adopting the threshold value judgment unit to compare a voltage between two ends of the capacitor with a voltage threshold value, and transmitting an operating state signal of the motor driver to the CPU, according to a comparison result.

12. The elevator electricity feedback method of claim 11, wherein the threshold value judgment unit transmits a high level signal to the CPU for representing that the motor driver is in the energy consuming state, and the threshold value judgment unit transmits a low level signal to the CPU for representing that the motor driver is in the energy generating state.

13. An elevator comprising a motor driver, an AC resistor, and the electricity feedback device of the claim 1.

* * * * *